United States Patent [19]

Chan et al.

[11] Patent Number: 4,789,322
[45] Date of Patent: Dec. 6, 1988

[54] CORRUGATOR WITH INTERMESHING OVERLAPPING MOLDBLOCK HALVES

[76] Inventors: Harry Chan, 89 Larkin Ave., Markham, Ontario L3P 4R1, Canada; Basilio Yi, 35 Hoover Dr., Thornhill, Ontario L3T 5M6, both of Canada

[21] Appl. No.: 123,668

[22] Filed: Nov. 23, 1987

[51] Int. Cl.⁴ .................... B29C 55/24; B29C 51/38; B29C 55/28; B29C 53/30
[52] U.S. Cl. ............................. 425/336; 425/337; 425/369; 425/388; 425/390; 425/392; 425/395; 425/396; 425/539
[58] Field of Search ............... 425/336, 370, 336, 337, 425/369, 370, 390, 392, 394, 395, 396, 233, 342, 408, 576, 575, 539, 540, 541

[56] References Cited

U.S. PATENT DOCUMENTS

| | | | |
|---|---|---|---|
| 3,280,430 | 12/0198 | Antrobus | 425/370 |
| 3,349,156 | 10/1967 | Zieg | 425/370 |
| 3,751,541 | 8/1973 | Hegller | 425/370 |
| 3,998,579 | 12/1976 | Nordström | 425/393 |
| 4,021,178 | 5/1977 | Braun | 425/392 |
| 4,199,314 | 4/1980 | Lupke et al. | 425/326.1 |
| 4,504,206 | 3/1985 | Lupke et al. | 425/185 |
| 4,681,526 | 7/1987 | Lupke | 425/336 |

*Primary Examiner*—Willard Hoag

[57] ABSTRACT

A corrugator for molding externally ribbed and corrugated thermoplastic pipes, including two trains of moldblock halves circulating respectively in two endless paths and cooperating with each other to form a travelling mold for the thermoplastic pipes. The halves of one train are biased in relation to and overlap those of the second train along the travelling mold and are provided with intermeshing elements hooking the halves of the two trains together.

1 Claim, 2 Drawing Sheets

CORRUGATOR WITH INTERMESHING OVERLAPPING MOLDBLOCK HALVES

BACKGROUND OF THE INVENTION

This invention relates to corrugators, particularly, but not exclusively, chainless, for molding thermoplastic pipes, externally ribbed or corrugated.

Known chainless apparatus (U.S. Pats. Nos. 4,021,178 and 4,504,206) include two trains of moldblock halves circulating respectively in two endless paths containing a straight forward run wherein the halves cooperate with each other in the directions of their circulation and perpendicularly to the latter, to form a travelling mold for the thermoplastic pipe, a return run and two semi-circumferential guide tracks for transferring the halves between said runs.

The independent halves of the known apparatus cannot withstand the hydraulic pressure of molding acting to separate the halves in the direction of their circulation. That is why, such apparatus cannot be used successfully in the molding of externally ribbed pipes (described, for example, in U.S. Pat. No. 3,998,579 and in blow molding of extremely large corrugated pipes.

SUMMARY OF THE INVENTION

The objective of the present invention is to overcome the above drawback of the known apparatus.

For this the halves of one said train are biased in relation to and overlap those of the second train along said travelling mold and are provided with at least two pairs of intermeshing elements hooking the halves of the two trains together, said elements of the halves of one train being engaged with the complimentary elements of the halves of the second train.

The elements can be represented by teeth, detents and the like.

To render justice, it should be noted that providing the halves with pins and sockets is known in the art (U.S. Pat. No. 4,119,314). However, in this apparatus the halves of the trains are mutually interconnected to form two chains and do not overlap each other, the elements being of positioning (locating) nature preventing the misalignment of the halves in the pairs constituting the moldblocks. Also, each halve has only one pair of the locating pins which would be not enough for modifying this known corrugator according to the present teaching.

A more complete appreciation of the present invention and the distinguishing characteristics, objectives and attendant advantages thereof set out herein are more apparent and obvious to one ordinary skilled in the art from the following detailed description, drawings and appended claims.

DESCRIPTION OF THE PREFERRED EMBODIMENTS

Figure 1:
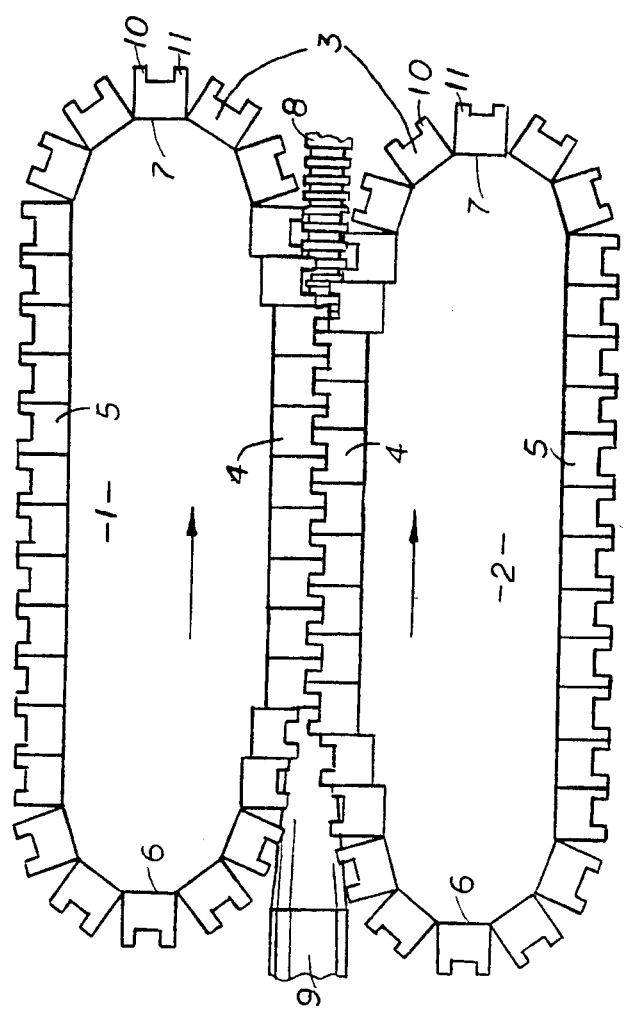
FIG. 1 is a schematic side view of a corrugator of the present invention with toothed intermeshing elements.

Referring now to the drawings, the apparatus of the present invention includes two trains 1 and 2 of moldblock halves 3 driven in an endless paths by means of sprockets or gears (not shown) similarly to the known apparatus. The paths have straight forward (4) and return (5) runs and semi-circumferential guide tracks 6 and 7 for transferring the halves 3 between the runs 4 and 5. The halves 3 are adjacent to each other in the runs 4 and 5 and cooperate with those of the opposite path in the run 4 to form a travelling mold for the produced thermoplastic pipe 8 extruded from a pipe die 9.

It should be mentioned that the above design corresponds basically to the corrugator described in the first two known patents.

The halves of one train are biased in relation to and overlap those of the second train in the run 4 and are provided with at least two pairs of intermeshing elements hooking the halves of the two trains together. The elements of the halves of one train are engaged with the complimentary elements of the halves of the second train.

The elements can be represented by teeth 10 and 11 (FIG. 1), detents (pins 12 and complimentary sockets 13—FIG. 2) and the like means.

Figure 2:
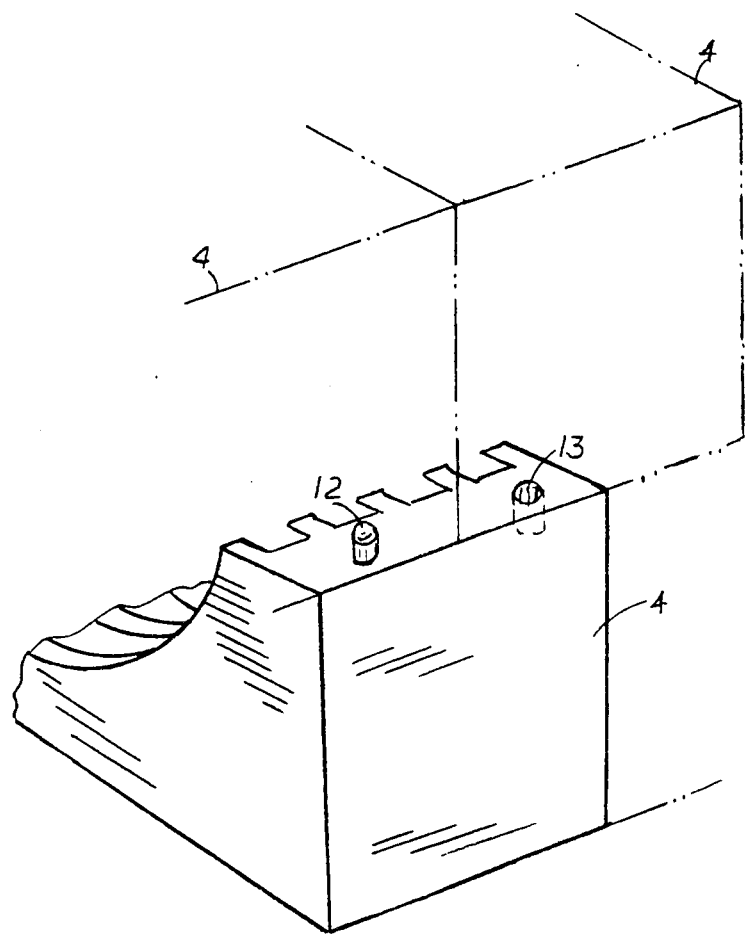
FIG. 2 is a perspective view of a moldblock halve of another embodiment of the present invention with detentlike elements.

It is clearly understood that a person skilled in the art could apply the same structure with different options. For example, the teeth can be rectangular (as shown in FIG. 1), sawlike, trapezoidal, rounded, helical, double-helical, etc. Also, the moldblocks can be articulately interconnected for constituting chainlike trains as shown, for instance, in U.S. Pat. No. 3,981,663.

In operation, an extrudate of the thermoplastic material flows from the die 9 into the travelling mold. The hydraulic pressure of the melt acting to separate the halves 3 in the run 4 is accepted by the intermeshing elements. From the point of view of the undercutting, the shape of the elements is irrelevant since in most cases the halves are guided in such a manner that the trains are driven toward and away from each other in a progressive motion without changing their orientation. This is described in the first two patents.

It is to be understood that the above detailed description of the embodiments of the present invention is examplary only. Various details of design and construction may be modified without departing from the spirit and scope of the invention as set forth in the appended claim.

What is claimed is:

1. A corrugator for molding externally ribbed and corrugated thermoplastic pipes, including two trains of moldblock halves circulating respectively in two endless paths containing a straight forward run in which the halves cooperate with each other in the directions of their circulation and perpendicularly to the latter, to form a travelling mold for the thermoplastic pipe, a return run and two semi-circumferential guide tracks for transferring the halves between said runs, the halves having intermeshing elements hooking the halves of the two trains together across the travelling mold, the improvement wherein the halves of one said train are biased in relation to and overlap the halves of the second train along the travelling mold in such a manner that each half of one train bridges and extends into two halves of the second train along the travelling mold, in order to withstand tensile forces of molding acting to make gaps between the halves of the same train along the travelling mold.

* * * * *